June 12, 1962     W. J. CRICHE     3,038,330
METAL HARDNESS MEASURING INSTRUMENT
Filed July 13, 1960
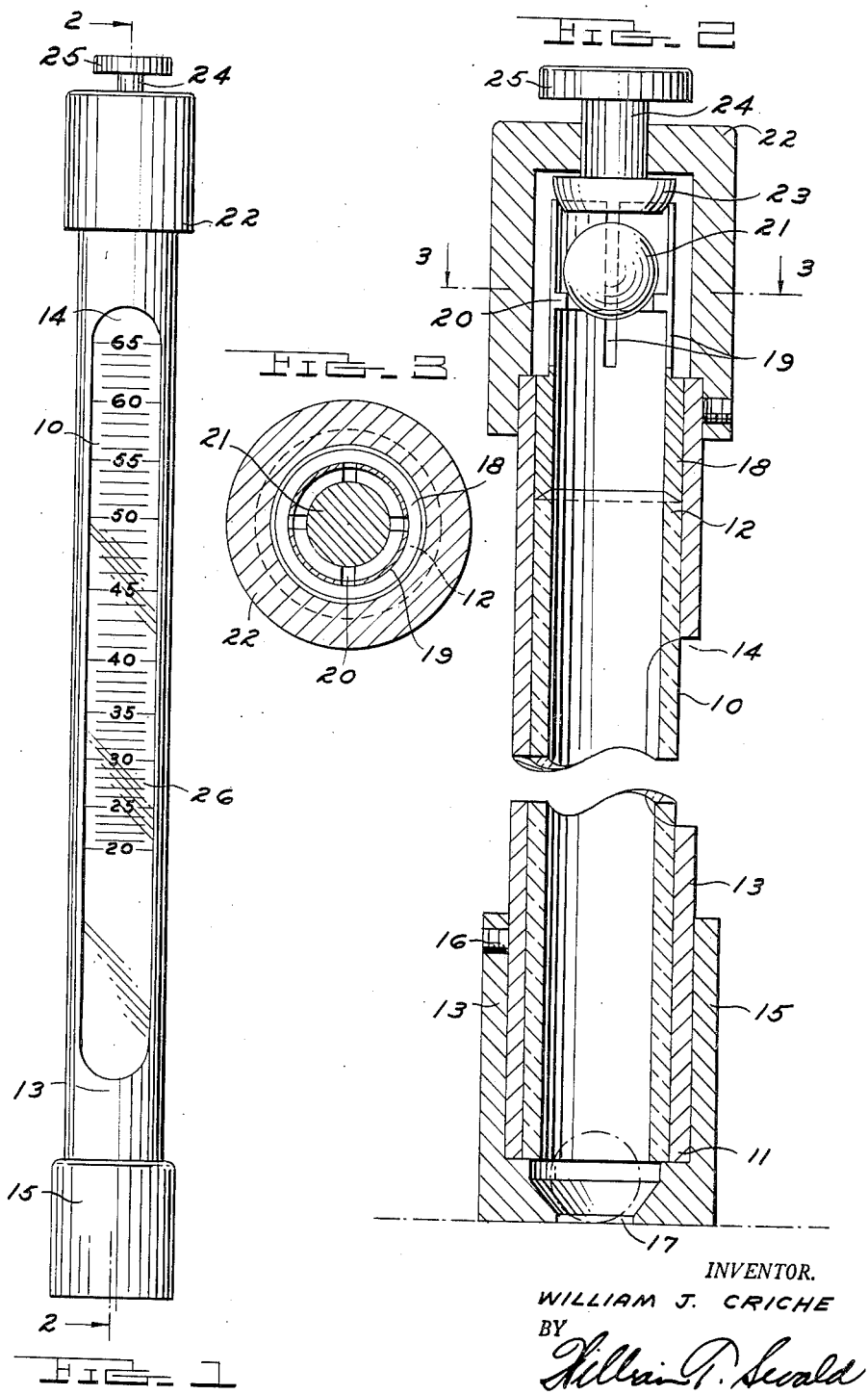
INVENTOR.
WILLIAM J. CRICHE
BY
ATTORNEY United States Patent Office 3,038,330
Patented June 12, 1962

3,038,330
METAL HARDNESS MEASURING INSTRUMENT
William J. Criche, Dearborn, Mich., assignor to George Q. McNamara, doing business as The Hard Chek Company, Detroit, Mich., an assumed name company of Michigan
Filed July 13, 1960, Ser. No. 42,610
6 Claims. (Cl. 73—79)

This invention relates to an accurate metal hardness measuring instrument completely devoid of release mechanism influence in testing.

Metal hardness measuring instruments have been employed heretofore to facilitate the testing of metals to determine their hardness, however, the several devices of the prior art have not proven entirely satisfactory inasmuch as they are complicated in design and construction, expensive to manufacture, difficult to use and position, and usually required that work piece be brought to the instrument, and further require careful use to avoid influencing the measurement through operation of the release mechanism.

With the foregoing in view, the primary object of the invention is to provide an accurate metal hardness measuring instrument which is simple in design and construction, inexpensive to manufacture, easy to use, easy to transport to the test piece, and which cannot transfer release mechanism influence to the measurement of the hardness of the test piece.

An object of the invention is to provide a ball drop hardness testing instrument wherein the device is settable by inverting the instrument to effect by-passing of the ball past spring fingers having detents for holding the ball in the set position.

An object of the invention is to provide spring fingers having ball holding detents and a cam-plunger adjacent thereto adapted to radially spread the fingers and detents outwardly so as to drop the ball from the set position to the test piece without release mechanism influence on the ball drop.

An object of the invention is to provide a collar supporting the spring fingers.

An object of the invention is to provide a device which can be used by experienced as well as inexperienced operators.

These and other objects of the invention will become apparent by reference to the following description of a metal hardness measuring instrument embodying the invention taken in connection with the accompanying drawing in which:

FIG. 1 is a side-elevational view of the device showing the viewing window and scale.

FIG. 2 is an enlarged and foreshortened cross-sectional view of FIG. 1, taken on the line 2—2 thereof showing the internal construction; and FIG. 3 is a cross-sectional view of FIG. 2 taken on a line 3—3 thereof showing the ball holding spring fingers and detents.

Referring now to the drawing wherein like numerals refer to like or corresponding parts throughout the several views, the metal hardness measuring instrument disclosed therein to illustrate the invention comprises a ball drop cylinder 10 having a bottom end 11 and a top end 12 preferably made of transparent material for easy viewing therethrough surrounded by an outer protective casing 13 having a sidewall window 14 therein, a bottom socket 15 attached to the outer casing 13 by a set screw 16 and having a bottom opening 17 axially aligned with the cylinder 10. The collar 18 rests on the cylinder 10 and nests inside the casing 13 and is axially aligned with the cylinder 10 and supports the spring fingers 19 above the cylinder 10 and collar 18 in axial alignment with the cylinder 10 and it is to be noted that an arcuate ridge or detent 20 is disposed on the fingers 19 extending radially inwardly so as to contact the ball 21 in supporting relationship as shown in FIG. 2.

More particularly the cap 22 surrounds the upper end of the casing 10, cylinder 13, collar 18 and spring fingers 20 and is spaced thereabove slightly to house the cam-plunger 23 which has a neck 24 extending through the cap 22 upon which the thumb button 25 is secured and it is obvious that by depressing the thumb-button 25 that movement is transferred to the cam-plunger 23 moving the upper ends of the spring fingers 19 outwardly so as to move the detents 20 radially outwardly out of ball 21 supporting relationship so as to permit the ball 21 to fall entirely without release mechanism influence through the cylinder to the aperture 17 so as to impact against the test piece upon which the device sits.

The ball bounces upwardly from the test piece and the height the ball bounce is registered on the scale 26 disposed on the cylinder 10.

It will be noted that the collar 18, spring fingers 19, and ball supporting detents 20 are preferably made of one piece of material by machining same from tubular stock and slitting same to form individual flexible spring fingers for co-operation with the cam-plunger 23.

After the ball has dropped in a test, the user inverts the device from the position seen in FIGS. 1 and 2 whereupon the ball drops from the point adjacent the aperture 17 and, due to the fact that the ball builds up momentum, it forces its way cam-wise past the detents 20 and moves to the position seen in FIG. 2. Upon righting the instrument to the position seen in the drawing the ball acquires no momentum so that it cannot flex the detents 20 and spring fingers 19 outwardly thereby resting on the detents 20 as supported by the flexible spring fingers 19.

In use, the device is positioned on a test piece as seen in FIGS. 1 and 2 and the user then places the thumb on the button 25 and presses downwardly whereupon the cam-plunger 23 is moved downwardly against the tops of the spring fingers 19 spreading them radially outwardly and moving the detents 20 therewith out of ball supporting relationship whereupon the ball 21 drops as previously stated.

The length of the ball drop, the material of the ball, the hardness of the ball, and the increments on the scale 26 are co-ordinated so that the height of the ball in its bounce reads against the scale to give an accepted reading in the industry.

It has been found that a tungsten-carbide ball 21 proves most suitable with the device as integrated and provides a much more accurately reading and durable test instrument.

The inventive hardness measuring instrument with these features constitutes a compact, durable, neat appearing, easily operated, and non-release-influenced device which is easily transported to the job and easily and accurately operable with complete simplicity.

Although but a single embodiment of the invention has been shown and described in detail, it is obvious that many changes may be made in the size, shape, detail, and arrangements of the various elements of the invention within the scope of the appended claims.

I claim:

1. A small, compact, easily transportable, and accurate metal hardness measuring instrument which is easily settable, easily releasable, and completely devoid of release mechanism influence in operation comprising a cylinder constituting a vertical non-interfering ball dropping chamber having a lower end open restable on a test piece and an upper open end; said cylinder having at least one transparent side for viewing the ball bounce height therethrough, a scale readable relative to the ball on said cylinder adjacent said transparent side, a collar at the top of said cylinder, spring fingers on said collar extending upwardly therefrom; said collar and fingers constituting an axial extension of said ball dropping chamber, detents on said fingers extending radially inwardly, a plunger above said fingers having a cam-portion contacting said fingers adapted to move said fingers radially outwardly to spread said detents apart so as to enlarge the diametrical space therebetween, and a ball disposed in said cylinder of a size so co-ordinated as to normally rest on said finger detents; said ball being non-influence-wise dropable off said detents by manually moving said plunger cam-portion downwardly to spread said fingers apart to move said detents radially outwardly out of ball supporting position to effect ball dropping.

2. A small, compact, easily transportable, and accurate metal hardness measuring instrument which is easily settable, easily releasable, and completely devoid of release mechanism influence in operation comprising a cylinder constituting a vertical non-interfering ball dropping chamber having a lower open end restable on a test piece and an upper end open; said cylinder having at least one transparent side for viewing the ball bounce height therethrough, a scale readable relative to the ball on said cylinder adjacent said transparent side, at least one spring finger extending upwardly from said cylinder; said at least one finger constituting an axial extension of said ball dropping chamber, a detent on said finger extending radially inwardly, a plunger above said finger having a cam-portion contacting said finger adapted to cam said finger radially outwardly to spread said detent outwardly, and a ball disposed in said cylinder of a size so co-ordinated as to normally rest on said finger detent; said ball being non-influence-wise dropable off said detent by manually moving said plunger-cam portion downwardly to flex said finger outwardly to move said detent radially outwardly out of ball supporting position to drop said ball.

3. A small, compact, easily transportable and locatable metal hardness testing and indicating measuring instrument which is easily settable, and releasable entirely without influence of the release means comprising a cylinder having at least one transparent side constituting a side view window, an open top end and an open bottom end; at least one springable finger adjacent said cylinder top end lying in the plane of said cylinder and disposed so as to be radially outwardly spring-wise movable, a detent on said finger intermediate the ends thereof movable with said finger so as to move radially, a ball in said cylinder adapted to spring-wise drop past said detent to the set position by inverting said cylinder; said finger and detent being adapted to support said ball in the set position on said detent when said cylinder is normally vertically disposed on its bottom end, a cam-plunger above said finger manually depressible thereagainst to move said finger spring-wise outwardly to move said detent radially out of ball supporting position to drop said ball without release influence downwardly in said cylinder to impact against the test piece upon which said cylinder bottom rests to effect ball upward bouncing, and a scale on said cylinder readable through said window against said ball to determine the ball bounce height thereon; said scale being calibrated with said ball drop length, ball material, and ball hardness for measuring the hardness of the test piece relative to the height of the ball bounce from a test piece.

4. In a device as set forth in claim 3 a collar adjacent said cylinder top supporting said spring finger.

5. A small, compact, easily transportable and locatable metal hardness measuring instrument which is easily settable and which is releasable entirely without influence of the release means comprising a cylinder having at least one side window, an open top end and an open bottom end; springable fingers adjacent said cylinder top end lying in the plane of said cylinder and disposed so as to be radially spring-wise movable, a detent on each said finger intermediate the ends thereof movable with said finger so as to move radially, a ball in said cylinder adapted to spring-wise drop past said detent to the set position by inverting said cylinder; said finger and detent being adapted to support said ball in the set position on said detent when said cylinder is normally vertically disposed on its bottom end, a cam-plunger above said fingers manually depressible thereagainst to move said finger springwise outwardly to move said detent radially out of ball supporting position to drop said ball without release influence downwardly in said cylinder to impact against the test piece upon which said cylinder bottom rests to effect ball upward bouncing, and a scale on said cylinder readable through said window against said ball to determine the ball bounce height thereon; said scale being calibrated with said ball drop length, ball material, and ball hardness for measuring the hardness of the test piece relative to the height of the ball bounce on a test piece.

6. In device as set forth in claim 5 a collar adjacent said cylinder top supporting said spring fingers.

References Cited in the file of this patent

UNITED STATES PATENTS

| | | |
|---|---|---|
| 1,490,836 | Lipps | Apr. 15, 1924 |
| 1,586,363 | Hall | May 25, 1926 |